(12) United States Patent
Yonishi et al.

(10) Patent No.: US 8,468,557 B2
(45) Date of Patent: Jun. 18, 2013

(54) RECEIVING APPARATUS AND CONTROL METHOD

(75) Inventors: Osamu Yonishi, Yokohama (JP); Takashi Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 544 days.

(21) Appl. No.: 12/563,769

(22) Filed: Sep. 21, 2009

(65) Prior Publication Data

US 2010/0077423 A1   Mar. 25, 2010

(30) Foreign Application Priority Data

Sep. 25, 2008   (JP) .................. 2008-246598

(51) Int. Cl.
*H04N 60/32* (2006.01)
*H04N 5/445* (2006.01)

(52) U.S. Cl.
USPC .................. 725/14; 725/23; 725/58

(58) Field of Classification Search
USPC ............... 725/14, 23, 58
See application file for complete search history.

(56) References Cited

U.S. PATENT DOCUMENTS

| | | | |
|---|---|---|---|
| 5,734,413 A * | 3/1998 | Lappington et al. | 725/141 |
| 2002/0178446 A1 * | 11/2002 | Sie et al. | 725/32 |
| 2004/0031046 A1 | 2/2004 | Weinblatt et al. | |
| 2006/0253330 A1 * | 11/2006 | Maggio et al. | 705/14 |
| 2007/0186252 A1 * | 8/2007 | Maggio | 725/86 |
| 2007/0192803 A1 * | 8/2007 | Chisaka | 725/61 |

FOREIGN PATENT DOCUMENTS

| | | |
|---|---|---|
| JP | 11-112903 A | 4/1999 |
| JP | 2004-289770 | 10/2004 |
| JP | 2006-050278 A | 2/2006 |

OTHER PUBLICATIONS

The above references (1 and 2) were cited in a Nov. 12, 2010 Japanese Office Action, which is enclosed with English Translation, that issued in Japanese Patent Application No. 2008-246598.

* cited by examiner

*Primary Examiner* — Kieu Oanh T Bui
(74) *Attorney, Agent, or Firm* — Cowan, Liebowitz & Latman, P.C.

(57) ABSTRACT

The present invention provides a receiving apparatus for receiving digital broadcast having a plurality of channels including a transition unit configured to transit a mode for controlling channel selection from a normal mode to a warning mode in the case that a determining unit determines that the broadcasting program is allowed to obtain a right to receive a reward, and a notifying unit configured to notify, in the warning mode, that the right to receive the reward will be lost, in the case that a detecting unit detects a channel selection operation that selects another channel from the viewing channel broadcasting a broadcast program which is allowed to obtain the right to receive the reward.

24 Claims, 16 Drawing Sheets

F I G. 4

```
General_event_descriptor() {
        descriptor_tag
        descriptor_length
        event_msg_group_id
        reserved_future_use
        time_mode
        if(time_mode==0) {
                reserved_future_use
        }else if(time_mode==0x01 || time_mode==0x05) {
                event_msg_MJDJST_time
        }else if(time_mode==0x02) {
                reserved_future_use
                event_msg_NPT
        }else if(time_mode==0x03) {
                reserved_furure_use
                event_msg_relativeTime
        }
        event_msg_type
        event_msg_id
        for(i=0 ; 1<N ; i++) {
                private_date_byte
        }
}
```

RECEIVING APPARATUS AND CONTROL METHOD

BACKGROUND OF THE INVENTION

1. Field of the Invention

The present invention relates to a receiving apparatus and a control method.

2. Description of the Related Art

The technology for providing a broadcast data print function in digital broadcasts is realized by sending print content overlapped with the broadcasting data. The broadcast data print function can send out various types of print content such as quiz programs answer sheets, discount coupons for shops, horoscopes, printed materials used for various contests; such a function also allows program-specific print content (information) to be provided.

Specifically, it is possible to make obtaining print content such as discount coupons and free item request forms a reward which a viewer can obtain by viewing a specific program. In such a case, the benefits are not limited to the viewer; the sponsor and broadcaster also benefit.

Here, additional information (signal code) is sent with the broadcast data of the program, a running total is kept of the number of times the additional information has been received, and when the number of times reaches a preset threshold, it is determined that the viewer has viewed the program for a given amount of time and the viewer is awarded the discount coupon or the like. Such a technology is disclosed in Japanese Patent Laid-Open No. 2004-289770.

However, according to Japanese Patent Laid-Open No. 2004-289770, when, while viewing a given program, the channel is changed by the viewer, by the start of a reserved program recording or the like, the count of the number of times additional information was received is discarded and the viewer loses the right to receive such rewards.

SUMMARY OF THE INVENTION

The present invention provides a new technology that allows preventing the loss of rewards while viewing a program.

According to one aspect of the present invention, there is provided a receiving apparatus for receiving digital broadcast having a plurality of channels including a detecting unit configured to detect a channel selection operation that conducts channel selection, a determining unit configured to determine whether or not the viewing state of a viewer satisfies a predetermined viewing condition of a broadcasting broadcast program so that the viewer of the broadcast program is able to obtain a right to receive a reward, a transition unit configured to transit a mode for controlling channel selection from a normal mode to a warning mode in the case that the determining unit determines that the broadcasting program is allowed to obtain the right to receive the reward, and a notifying unit configured to notify, in the warning mode, that the right to receive the reward will be lost, in the case that the detecting unit detects a channel selection operation that selects another channel from the viewing channel broadcasting a broadcast program which is allowed to obtain the right to receive the reward.

Further aspects of the present invention will become apparent from the following description of exemplary embodiments with reference to the attached drawings.

BRIEF DESCRIPTION OF THE DRAWINGS

FIG. 4 is a diagram illustrating a data construction of a generic event message.

DESCRIPTION OF THE EMBODIMENTS

Figure 1:
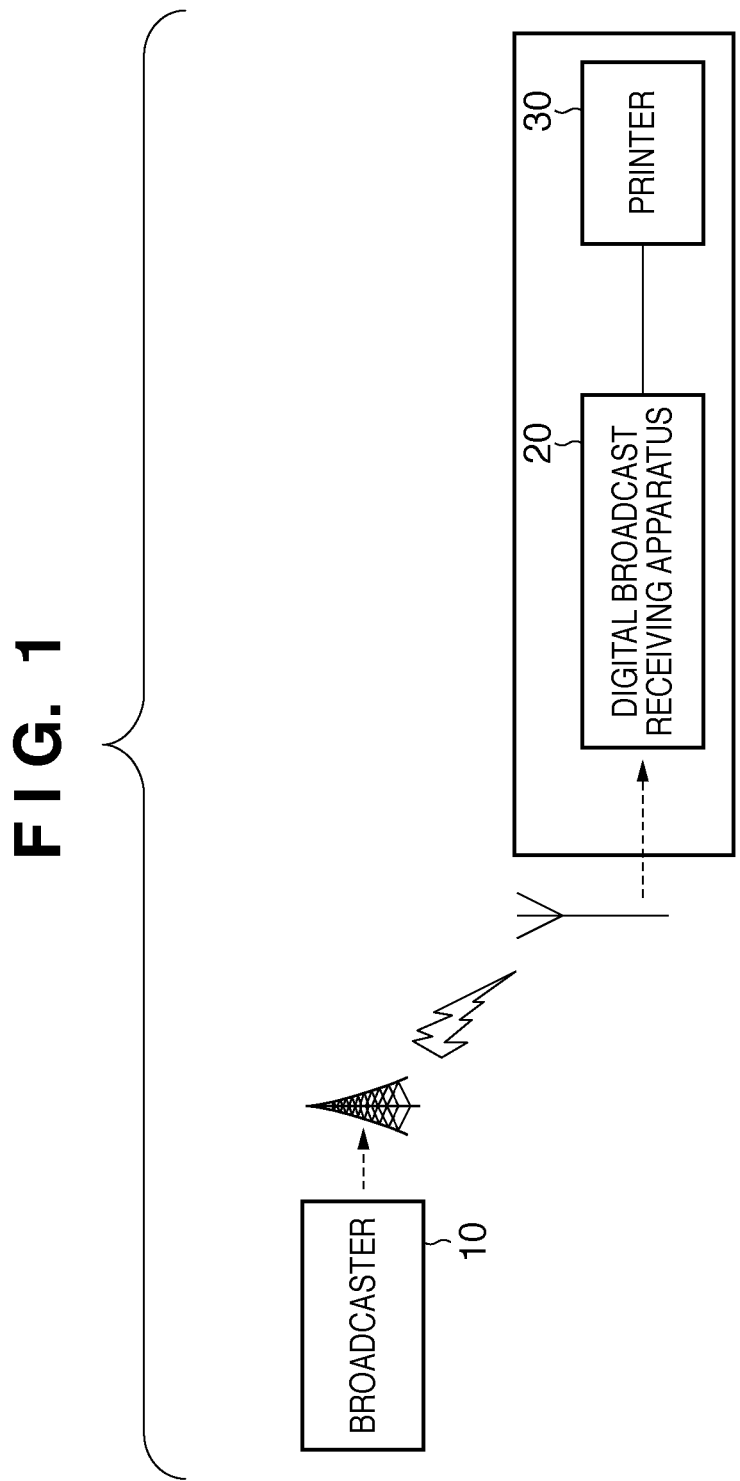
FIG. 1 is a diagram illustrating a broadcast system including a digital broadcast receiving apparatus according to one aspect of the present invention.

Preferred embodiments of the present invention will be described below with reference to the accompanying drawings. Note that the same reference numerals are appended to the same elements in each figure, and redundant descriptions are omitted.

FIG. 1 is a diagram illustrating a broadcast system including a digital broadcast receiving apparatus according to one aspect of the present invention. The broadcast system includes, as shown in FIG. 1, a broadcaster 10, a digital broadcast receiving apparatus 20, and a printer 30. The broadcaster 10 broadcasts a plurality of digital broadcasts that are corresponding to a plurality of broadcast programs. The digital broadcast receiving apparatus 20, via an antenna, receives the plurality of digital broadcasts sent out from the broadcaster 10. The printer 30 is connected to the digital broadcasting receiving apparatus 20 via a network cable, and operates as a printing device that prints print content obtained (received) by the digital broadcast receiving apparatus 20.

Figure 2:
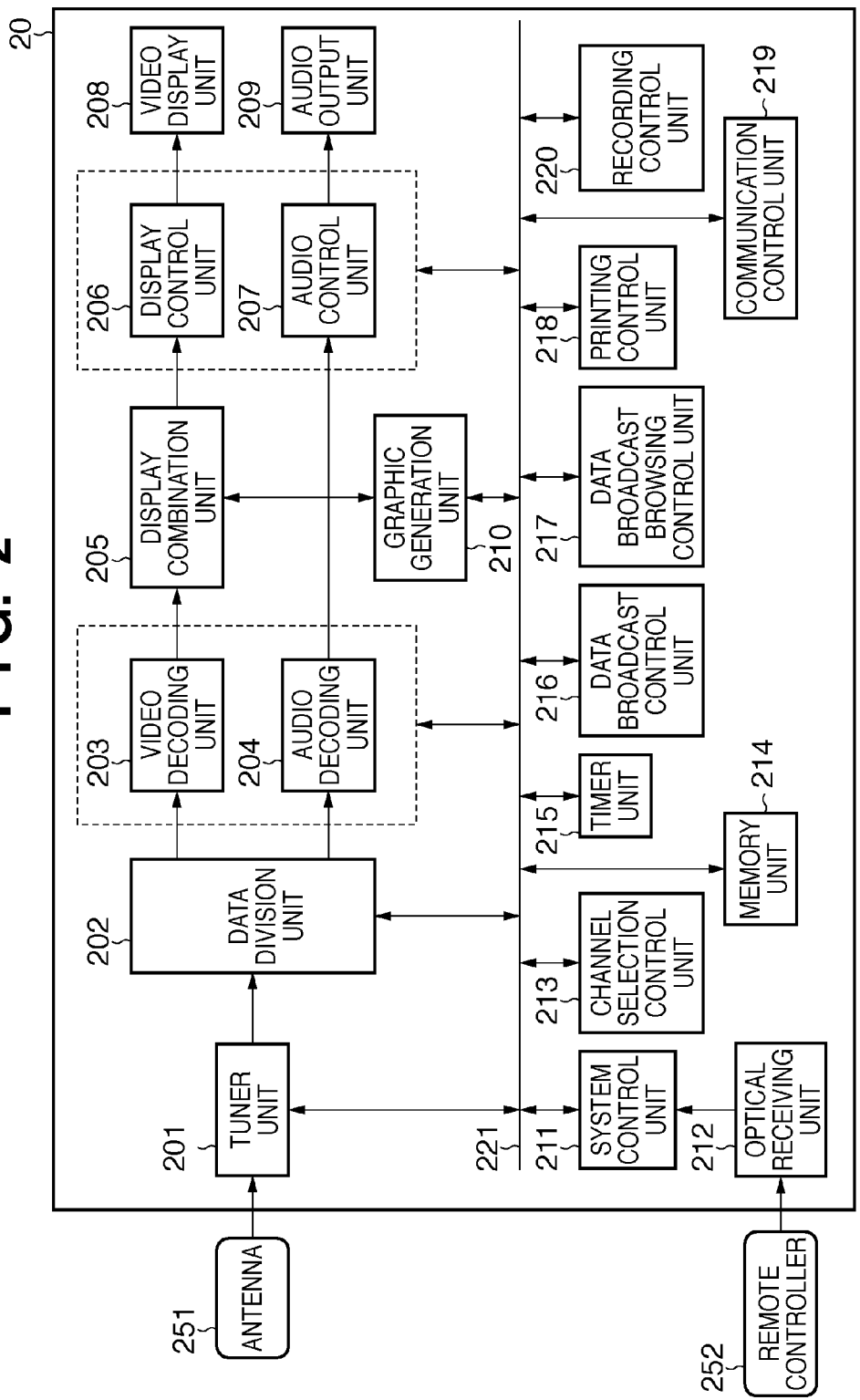
FIG. 2 is a block diagram illustrating an outline of the system architecture and the connection architecture with the outside of the digital broadcast receiving apparatus according to one aspect of the present invention.

FIG. 2 is a block diagram illustrating an outline of the system architecture and the connection architecture with the outside of the digital broadcast receiving apparatus 20 according to one aspect of the present invention. The digital broadcasting receiving apparatus 20 includes a turner unit 201, a data division unit 202, a video decoding unit 203, an audio decoding unit 204, a display combination unit 205, and a display control unit 206. Further, the digital broadcast receiving apparatus 20 includes an audio control unit 207, a video display unit 208, an audio output unit 209, a graphic generation unit 210, a system control unit 211, an optical receiving unit 212, and a channel selection control unit 213. Furthermore, the digital broadcast receiving apparatus 20 includes a memory unit 214, a timer unit 215, a data broadcast control unit 216, a data broadcast browsing control unit 217, a printing control unit 218, a communication control unit 219 and a recording control unit 220. Here, each component of the digital broadcast receiving apparatus 20 is connected to each other through a system bus 221.

The digital broadcast receiving apparatus 20 has a channel selection function of the television broadcast as a television function. Moreover, the digital broadcast receiving apparatus 20, has, as an extended television function, a digital broadcast browsing function and a printing function specified in "Data Coding and Transmission specification for Digital Broadcasting, ARIB STD-B24 version 4.4 of Association of Radio Industries and Business of Japan".

First, the channel selection function of the digital broadcast receiving apparatus 20 is explained. The channel selection function is the function that receives a digital broadcast signal at the tuner unit 201 via the antenna 251, and according to the viewer's channel selection, outputs video and program information, etc., to the video display unit 208, and outputs audio to the audio output unit 209.

Specifically, the system control unit 211 receives, via the optical receiving unit 212, information indicating the viewer's channel selection operation conducted by a viewer using a remote controller 252, based on the information indicating the viewer's channel selection operation determines the channel selected by the viewer, and requests channel selection of the determined channel to the channel selection control unit 213. In other words, the system control unit 211 detects the channel selection operation that conducts channel selection. The channel selection control unit 213, based on the request (channel selection request) by the system control unit 211, starts the channel selection control at the tuner unit 201 and the data division unit 202.

The tuner unit 201 performs a demodulation process and error correcting process on the input broadcast signal, and then forms a transport stream (hereinafter: TS), which is output to the data division unit 202.

The TS is multiplexed with video data, audio data, program information data, data broadcast data, current time information, etc., of a plurality of channels. The program information data includes print content meta-information, a program name, explanation of the program contents, broadcasting channel, broadcasting time information (starting time, continuing time), program genre information, etc. The data broadcast data is continuously sent out from the broadcaster 10 according to DSM-CC data carousel method described in standards such as ISO/IEC13818-6 and ARIB standard STD-B24. The time information includes year, month, day information and hour, minute, second information.

The data division unit 202 divides the video data, audio data, program information data, data broadcast data, time information, etc., that belong to the predetermined channel (the viewer selected channel) from the input TS. The data division unit 202 outputs the divided video data and divided audio data to the video decoding unit 203 and audio decoding unit 204, respectively. Further, the data division unit 202 outputs the program information data and data broadcast data to the memory unit 214 to store these program information data and data broadcast data. Furthermore, the data division unit 202 outputs the current time information to the timer unit 215. The timer unit 215 counts the time information.

The video decoding unit 203 conducts a decoding process such as MPEG decoding on the input video data, and then outputs the results to the display combination unit 205.

The audio decoding unit 204 conducts a decoding process such as MPEG decoding on the input audio data, and then outputs the results to the audio control unit 207.

The display combination unit 205 combines the decoded video data decoded in the video decoding unit 203 with the graphic data generated in the graphic generation unit 210.

The display control unit 206 converts video data into display data suited for the display resolution, color and refresh rate (timing is included) of the video display unit 208, and outputs the results to the video display unit 208. The video display unit 208 displays the video based on the data received from the display control unit 206.

The audio control unit 207, changes the volume level, etc., of the audio data and outputs it to the audio output unit 209. The audio output unit 209 outputs the audio based on the audio data received from the audio control unit 207.

When the above channel selection operation is finished normally, the channel selection control unit 213 stores selected channel information in the memory unit 214.

Next, the data broadcast browsing function of the digital broadcast receiving apparatus 20 is explained. The system control unit 211 receives, via the optical receiving unit 212, information of the viewer's browsing operations conducted on the remote controller 252, and requests the browsing process of data broadcast to the data broadcast control unit 216 based on this operation information.

The data broadcast control unit 216 obtains the data broadcast data stored in the memory unit 214. The data broadcast control unit 216 sends the obtained data broadcast data to the data broadcast browsing control unit 217, and requests the browsing process. Here, in the case that the data needed for the browsing process of data broadcast is not stored in the memory unit 214, the data broadcast control unit 216 requests obtaining data broadcast data from the data division unit 202.

The print control unit 218 controls the operations related to printing (as an example, printing the print content received from the broadcaster 10 using the printer 30).

The communication control unit 219 controls the communications (transmitting and receiving of data) with the external apparatus (for example, printer 30) connected to the digital broadcasting apparatus 20.

First Embodiment

Hereinafter, in a digital broadcast receiving apparatus 20, a case in which the viewer is viewing a broadcast program where the viewer is allowed to obtain the right to receive a reward by satisfying a predetermined condition (viewing condition) is explained. As the reward, print content that can be printed using the printer 30 connected to the digital broadcast receiving apparatus 20, image contents such as still images, videos, applications that can be executed on digital broadcasting apparatus 20, etc., are considered. In this regard, in the present embodiment, a case that obtains the right to receive print content by satisfying the predetermined condition (viewing condition) is explained (hereinafter: print-based viewer reward service).

Figure 3:
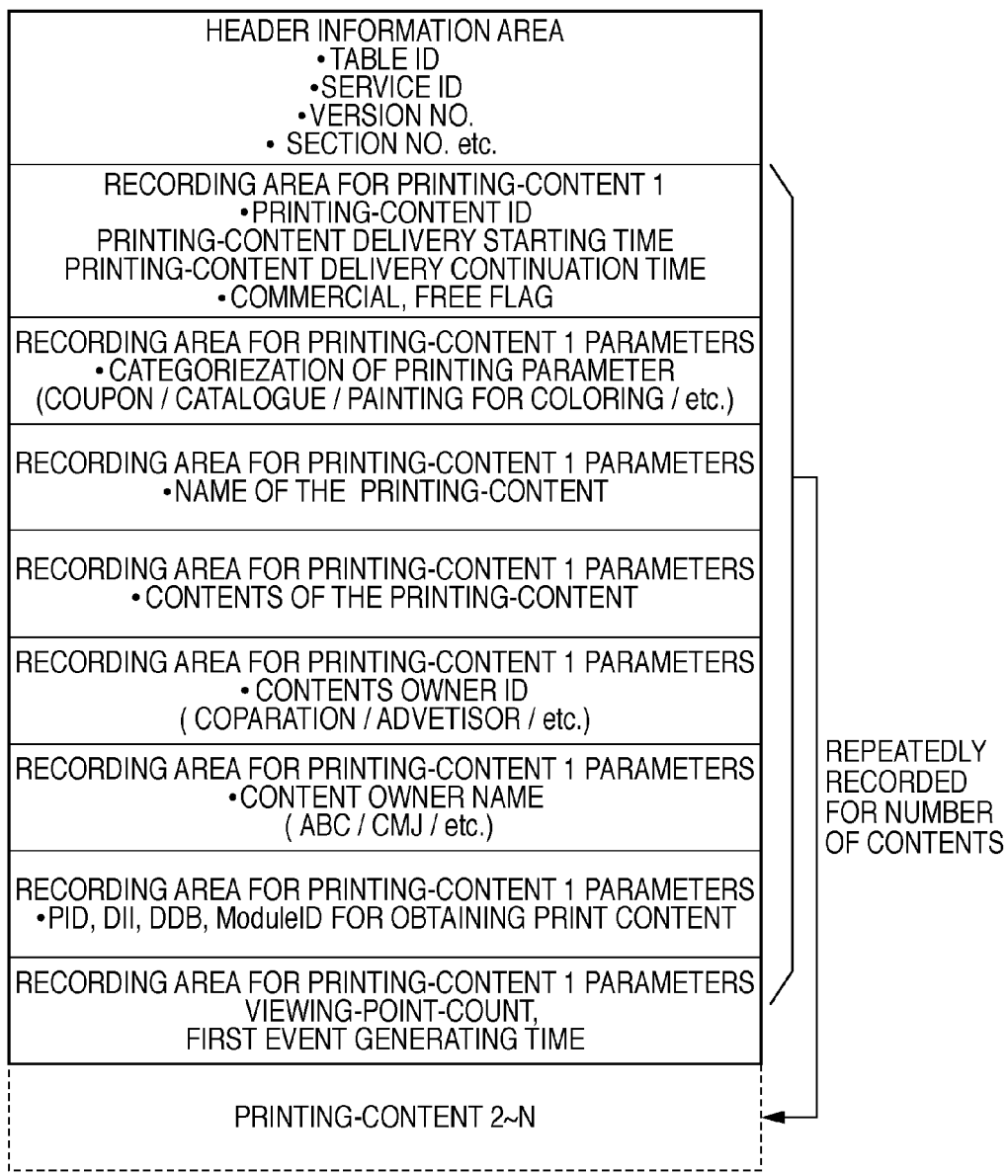
FIG. 3 is a diagram illustrating exemplary print content meta-information included in program information data.

When the broadcaster 10 sends out the broadcast data of the digital broadcast overlapped with print content, concurrently, as program information data of this broadcasting program (SI information) print content meta-information is sent by overlapping. The print content meta-information includes, as shown in FIG. 3, print content type, print content name and print content contents, and as a viewing condition, includes viewing-point-count and first event generating time information. FIG. 3 is a diagram illustrating exemplary print content meta-information included in program information data.

In the digital broadcast receiving apparatus 20, the system control unit 211 determines, based on the print content meta-information included in the program information data of the currently broadcasted broadcast program of the current channel selection, whether or not the broadcast program includes a print-based viewer reward service. Specifically, if the print content meta-information defines a viewing-point-count, the system control unit 211 determines it as a broadcast program including a print-based viewer reward service, and if the print content meta-information does not define a viewing-point-count, the system control unit 211 determines it as a broadcast program not including a print-based viewer reward service.

Moreover, the system control unit 211 confirms whether or not the broadcast program including the print-based viewer reward service is viewed while satisfying the predetermined viewing condition. In present embodiment, system control unit 211 counts the viewing points using event messages, and determines whether or not the broadcast program including the print-based viewer reward service is viewed while satisfying the predetermined viewing condition. An event message is message sent from the broadcaster 10 to an application operated by the digital broadcast receiving apparatus 20 as a notification or message sent according to a designated time. The event message sending method is described in the standard "Data Coding and Transmission specification for Digital Broadcasting, ARIB STD-B24 version 4.4 of Association of Radio Industries and Business of Japan".

Event message type is defined by generic event message descriptor time_mode. FIG. 4 is a diagram illustrating an exemplary data construction of a generic event message. As an example, if time_mode=0x00, the digital broadcast receiving apparatus 20 generates an event as soon as the event message is received. Moreover, if time_mode=0x03, the digital broadcast receiving apparatus 20 generates an event after passing a time duration defined in event_msg_relativeTime from the starting time of the broadcast program.

Figure 5:
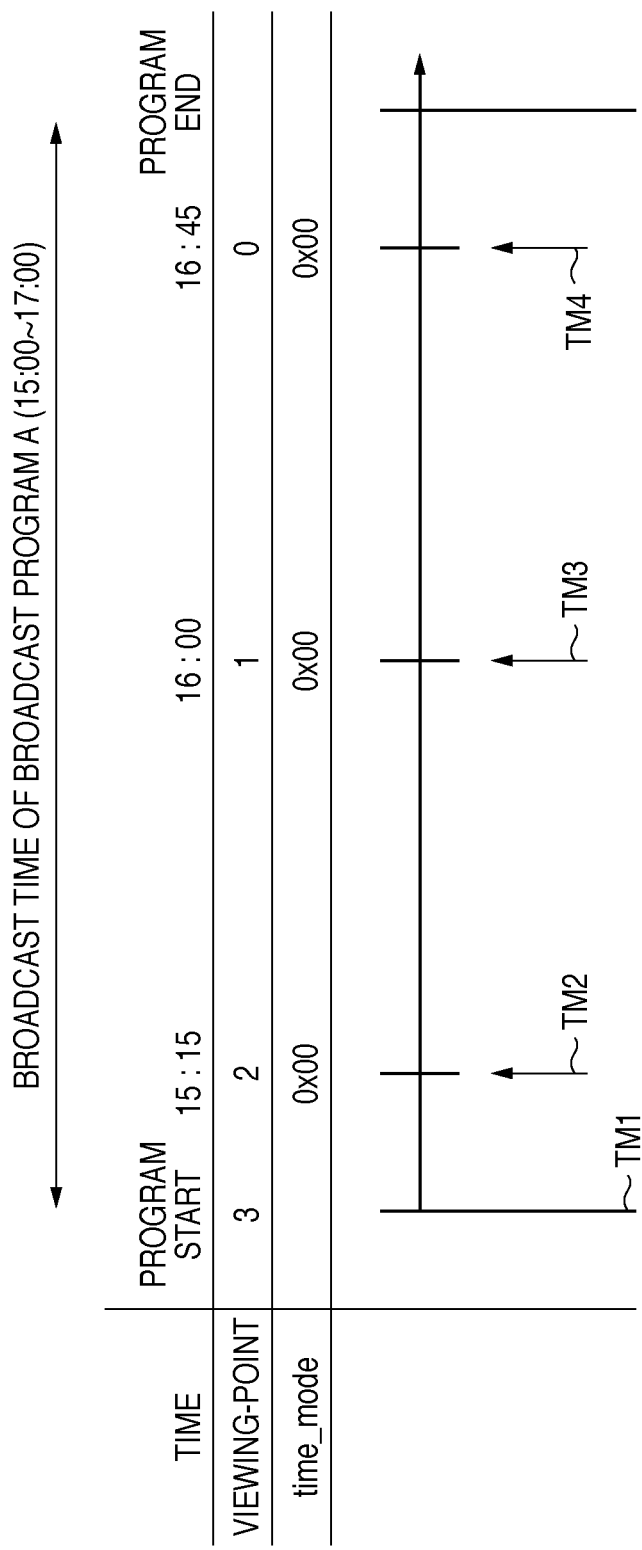
FIG. 5 is a diagram illustrating an overview of a broadcast program, which includes a print-based viewer reward service, from the point at which viewing of the program commences up to the point at which the right to receive print content is obtained, when the event message type is time_mode=0x00.

FIG. 5 is a diagram illustrating the overview of a broadcast program, which includes the print-based viewer reward service, from the point at which viewing of the program commences up to the point at which the right to receive print content, when the event message type is time_mode=0x00. In FIG. 5, the broadcast program including the print-based viewer reward service starting time and the viewing start time are considered to be the same.

Referring to FIG. 5, first, at the timing (viewing starting timing) TM1 of broadcast program which includes a print-based viewer reward service, starts obtaining up to the necessary viewing-point-count (viewing condition) to obtain the reward from print content-meta-information. In the present embodiment, the viewing-point-count necessary (viewing condition) for obtaining the print content is set as 3. Moreover, the first event generating time is defined as 15:15 (hrs). As explained later, at timing TM1, a mode for controlling channel selection of the plurality of channels, is transited to warning mode form normal mode by the channel selection control unit 213.

Next, at the timing TM2 where the time is 15:15 (hrs), the first event message is received. Since the event message type is time_mode=0x00, as soon as the message is received, the viewing-point-count is reduced by 1. As a result, the viewing-point-count becomes 2.

Next, at the timing TM3 where the time is 16:00 (hrs), the second event message is received. Since the event message type is time_mode=0x00, as soon as the message is received, the viewing-point-count is reduced by 1. As a result, the viewing-point-count becomes 1.

Next, at the timing TM4 where the time is 16:45 (hrs), the third event message is received. Since the event message type is time_mode=0x00, as soon as the message is received, the viewing-point-count is reduced by 1. As a result, the viewing-point-count becomes 0, and therefore, the viewer obtains the rights to receive a print content as the reward.

Figure 6:
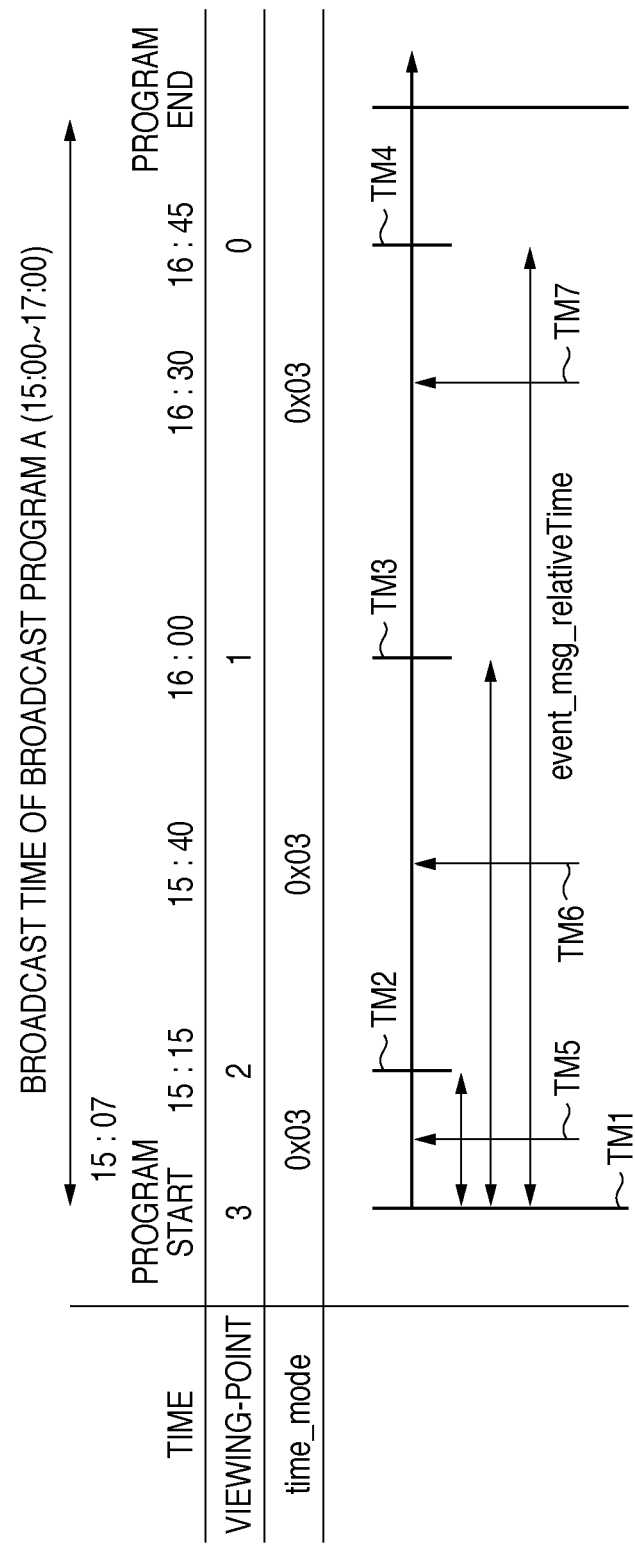
FIG. 6 is a diagram illustrating the overview of a broadcast program, which includes a print-based viewer reward service, from the point at which viewing of the program commences up to the point at which the right to receive print content is obtained, when the event message type is time_mode=0x03.

FIG. 6 is a diagram illustrating the overview of a broadcast program, which includes the print-based viewer reward service, from the point at which viewing of the program commences up to the point at which the right to receive print content is obtained, when the event message type is time_mode=0x03. In FIG. 6, the broadcast program including the print-based viewer reward service starting time and the viewing starting time are considered to be the same.

Referring to FIG. 6, first, at the starting timing (viewing starting timing) TM1 of broadcast program which includes a print-based viewer reward service, starts obtaining up to the necessary viewing-point-count (viewing condition) to obtain the reward from print content-meta-information. In the present embodiment, the viewing-point-count necessary (viewing condition) for obtaining the print content is set as 3. Next, at the timing TM5 where the time is 15:07 (hrs), the first event message is received. Because the event message type is time_mode=0x03, the event_msg_relativeTime is referred to. Since the event_msg_relativeTime is defined as 15 minutes in the present embodiment, at the timing TM2 where the time is 15:15 (hrs) (15 minutes after 15:00 (hrs)), the viewing-point-count is reduced by 1. As a result, the viewing-point-count becomes 2.

Next, at the timing TM6 where the time is 15:40 (hrs), the second event message is received. Because the event message type is time_mode=0x03, the event_msg_relativeTime is referred to. Since the event_msg_relativeTime is defined as 1 hour in the present embodiment, in the timing TM3 where the time is 16:00 (hrs) (1 hour after 15:00 (hrs)), the viewing-point-count is reduced by 1. As a result, the viewing-point-count becomes 1.

Next, at the timing TM7 where the time is 16:30 (hrs), the third event message is received. Because the event message type is time_mode=0x03, the event_msg_relativeTime is referred to. Since the event_msg_relativeTime is defined as 1 hour and 45 minutes in the present embodiment, in the timing TM4 where the time is 16:45 (hrs) (1 hour and 45 minutes after 15:00 (hrs)), the viewing-point-count is reduced by 1. As a result, the viewing-point-count becomes 0, and therefore, the viewer obtains the right to receive print content as the reward.

Figure 7:
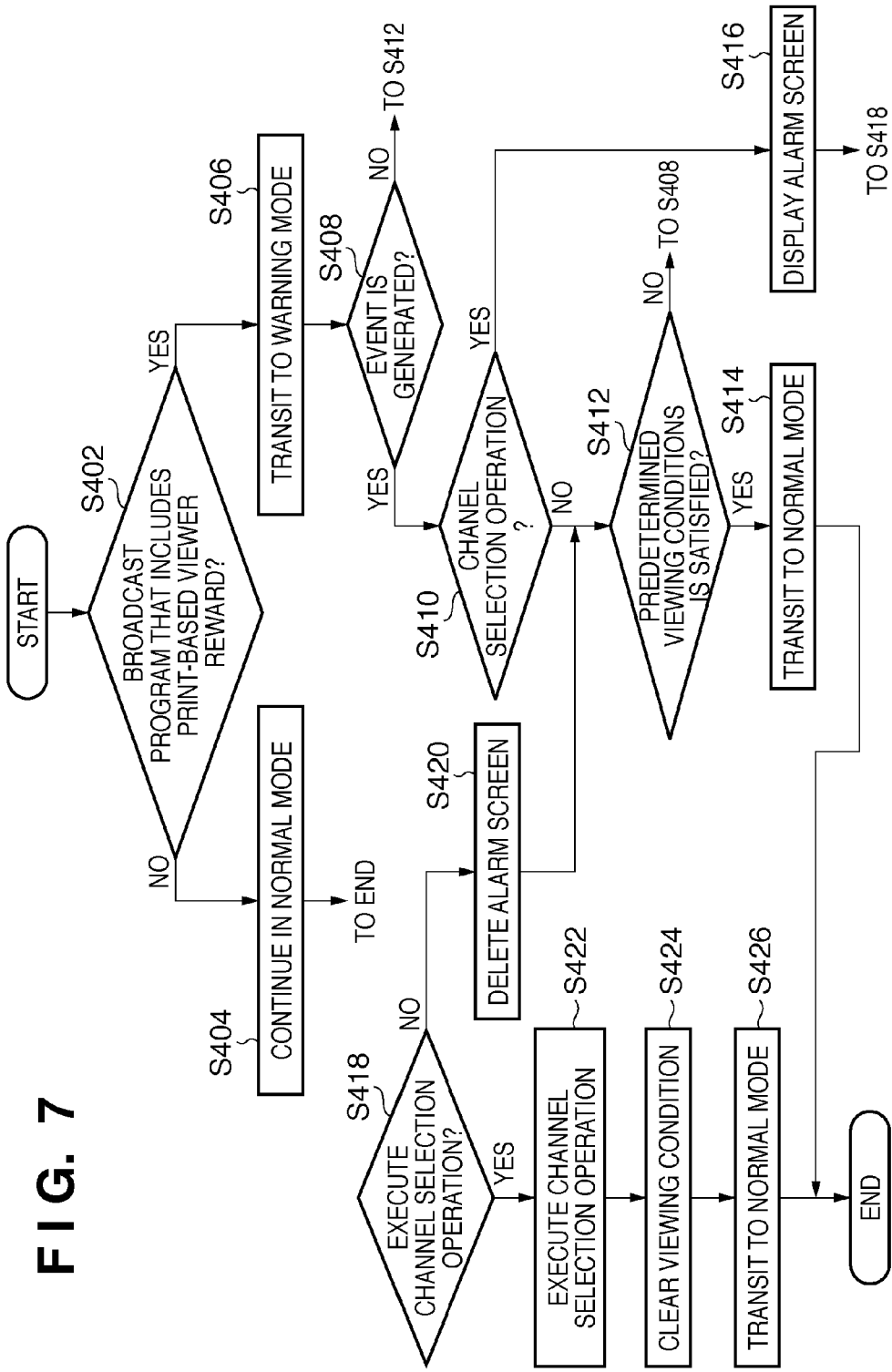
FIG. 7 is a flowchart for explaining exemplary operations (processing) of a digital broadcast receiving apparatus according to one aspect of the present invention.

FIG. 7 is a flowchart for explaining exemplary operations of the digital broadcast receiving apparatus 20 according to one aspect of the present invention. Here, special characteristics exist when the operation of the digital broadcast receiving apparatus 20 has transited the mode for controlling channel selection to warning mode, and therefore, the explanation below will be given with a focus on the warning mode.

Referring to FIG. 7, in step S402, the system control unit 211 determines whether or not the viewed broadcast program selected by conducting a channel selection among a plurality of broadcast programs is a broadcast program that includes the print-based viewer reward service.

In the case that the viewing broadcast program channel selected among a plurality of channels is determined as a broadcast program which does not include a print-based viewer reward service, in step S404, the channel selection control unit 213 maintains the mode, which related to channel selection, in the normal mode. The normal mode is a mode that executes the above-explained channel selection processes, based on the viewer's channel selection instructions and reserved broadcast program recording.

On the other hand, in the case that the viewing broadcast program channel selected from among a plurality of channels is determined as a broadcast program which includes the print-based viewer reward service, in step S406, the channel selection control unit 213 transits the mode, which related to channel selection, from the normal mode to the warning mode. The warning mode is a mode, when broadcast program including the print-based viewer reward service has been viewed, which gives notification of possible loss of the reward when a change in channel selection is detected due to viewer's instruction or due to recording of a reserved broadcast program.

In step S408, the system control unit 211 determines whether or not any event due to viewer operations using the remote controller 252 or received event message has generated.

In the case it is determined no event has generated, the process proceeds to step S412. In the case it is determined an event has generated, the process proceeds to step S410.

In step S410, the system control unit 211 determines whether or not the event is the channel selection operation.

In the case it is determined as the channel selection operation, the process proceeds to step S416. In the case it is determined as a non-channel selection operation, the process proceeds to step S412.

In step S412, system control unit 211 confirms whether or not the predetermined viewing condition is satisfied.

In the case the predetermined viewing condition is not satisfied, the process returns to the step S408. In the case the predetermined viewing condition is satisfied, the process proceeds to step S414.

In step S414, the system control unit 211 receives, via the tuner unit 201, the print content and stores it in the memory unit 214, and the channel selection control unit 213 transits the mode which relates to channel selection, from warning mode to normal mode.

Figure 8:
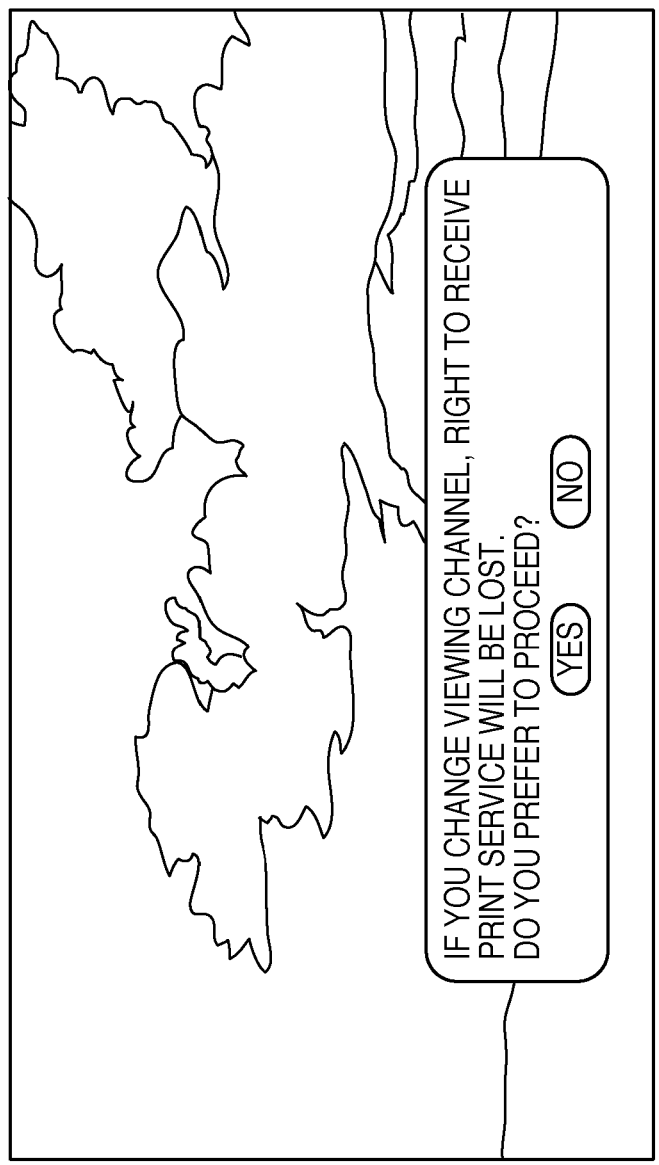
FIG. 8 is an exemplary alarm screen displayed on a display unit in warning mode.
Figure 9:
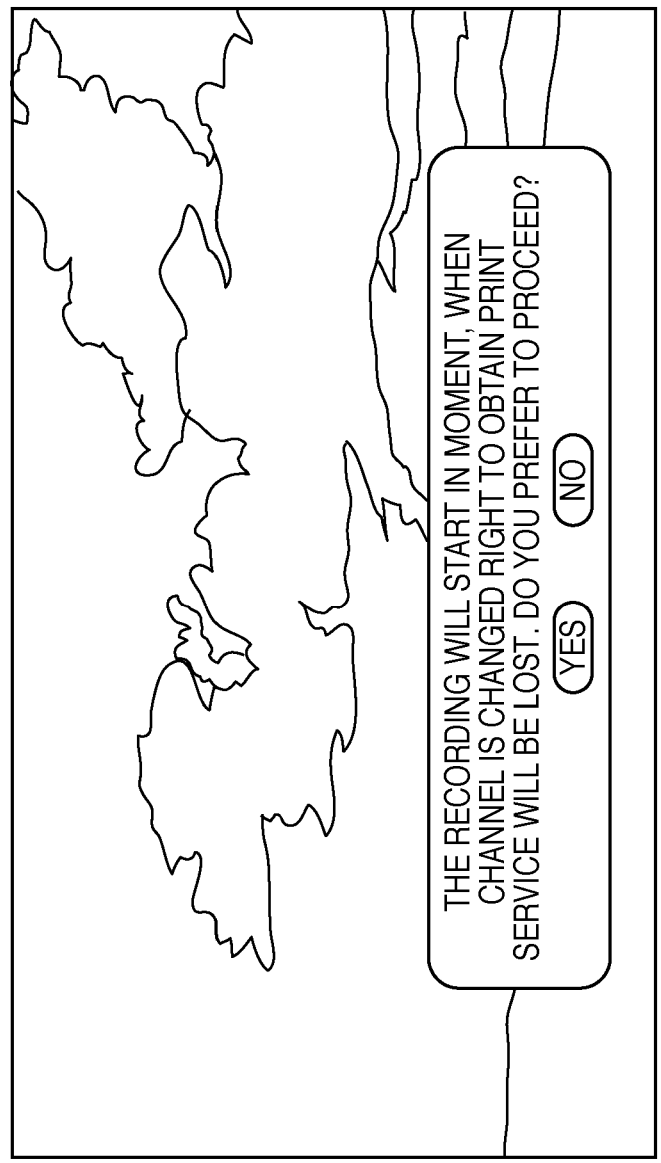
FIG. 9 is an exemplary alarm screen displayed in a display unit in warning mode.

On the other hand, the event is determined to be the channel selection operation, in step 416, a warning that the right to receive the reward may be lost is notified (displayed a alarm screen). As an example, in the case of a user operation based channel selection operation, the channel selection control unit 213 requests generation of an alarm screen such as that shown in FIG. 8 to the graphic generation unit 210. Further, in the case of a reserved broadcast program recording channel selection operation, the channel selection control unit 213 requests generation of an alarm screen such as that shown in FIG. 9, to the graphic generation unit 210. FIG. 8 is an alarm screen displayed on a display unit to notify "If you change the viewing channel, the right to receive print service will be lost. Do you prefer to proceed?" in the case of changing the channel by viewer operation. FIG. 9 is an alarm screen displayed in a display unit to notify "The recording will start in a moment, when the channel is changed, the right to receive print service will be lost. Do you prefer to proceed?" in the case of changing the channel by reserved broadcast program recording operations. Then, the alarm screen (FIG. 8 and FIG. 9) generated by the graphic generation unit 210 is displayed on the video display unit 208. Here, both FIG. 8 and FIG. 9 are exemplary alarm screens displayed on the video display unit 208.

In step S418, the channel selection control unit 213 determines whether the channel selection operation is executed or not. Specifically, the channel selection control unit 213 determines whether the "Yes" button, which instructs an execution of the channel selection operation, or "No" button, which instructs a suspension of the channel selection operation, on the alarm screen shown in FIG. 8 or FIG. 9 displayed on the video display unit 208 in the step S416 is selected.

In the case that the channel selection operation is not executed (in other words, the "No" button is selected in the alarm screens of FIG. 8 and FIG. 9), in step S420, the channel selection control unit 213 deletes the alarm screen displayed on the video display unit 208 and returns to step S412. In this case, the channel selection control unit 213 does not execute the above channel selection process.

On the other hand, in the case that the channel selection operation is executed (in other words, the "Yes" button is selected in the alarm screen of FIG. 8 and FIG. 9), in step S422, the channel selection control unit 213 executes the above channel selection process.

Moreover, in step S424, the system control unit 211 clears (resets) the viewing conditions (the viewing-point-count of the present embodiment) up to that moment. Due to this process, the right to receive print content (the reward) obtained by viewing the broadcast program including the print-based viewer reward service is lost.

In step S426, the channel selection control unit 213 transits the mode, which relates to channel selection, from warning mode to normal mode.

According to the first embodiment, while viewing the broadcast program which can provide the right to receive a reward when the predetermined viewing condition is satisfied, when the channel selection operation has occurred, the possibility of losing the right to receive the reward is notified. For this reason, the viewer can cancel the channel selection operation and continue watching the broadcast program, and therefore, loss of the right to receive the reward can be prevented.

Figure 10:
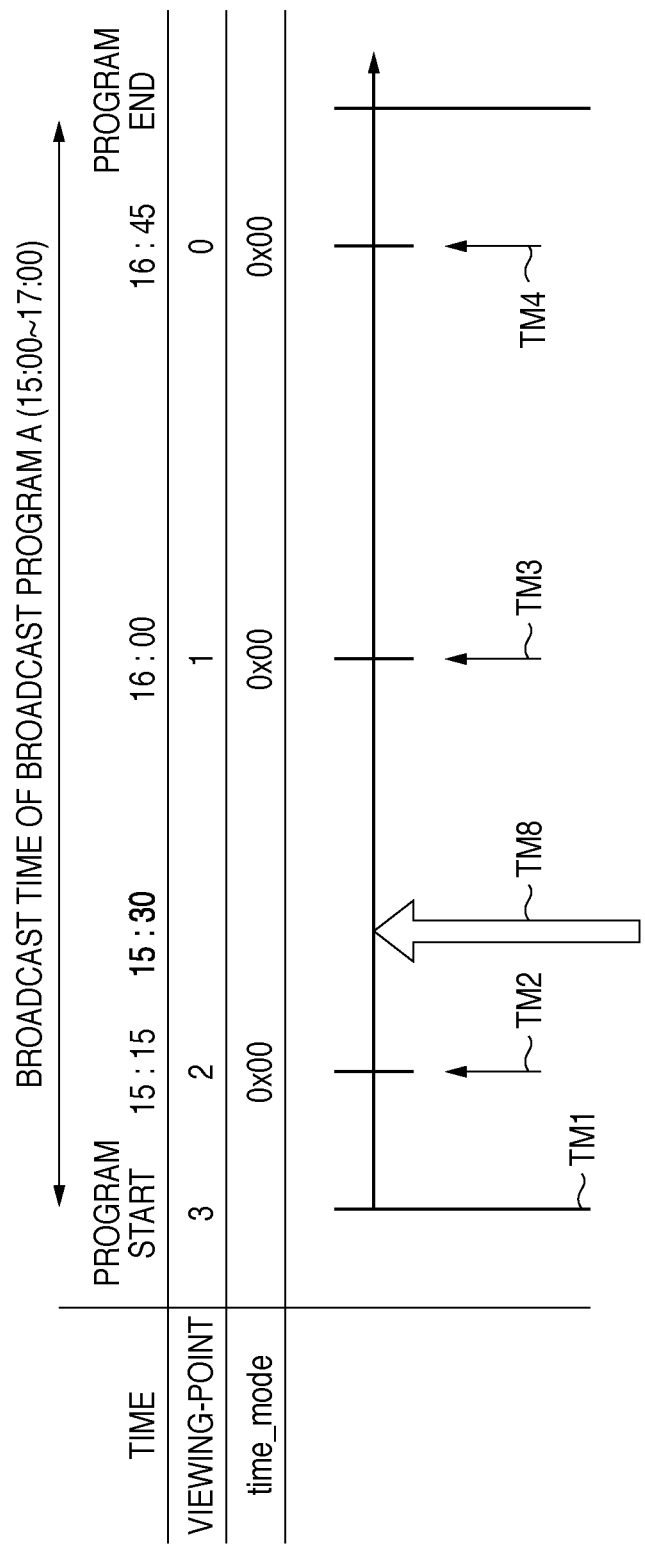
FIG. 10 is a diagram illustrating an overview of a broadcast program, which includes a print-based viewer reward service, when another broadcast program channel is selected after viewing of the program has commenced.

As in FIG. 10, after the starting time of a broadcast program that includes a print-based viewer reward service, as an example, timing TM8 where time is 15:30 (hrs) channel selecting a broadcasting-program has been considered (in other words, viewing of the program started). In this case, the system control unit 211 refers to the first event-generating time (15:15 (hrs)) from the print content meta-information and compares viewing starting time and first event-generating time (in other words, determines whether or not it is a timing that the reward obtaining right is allowed). Then, in the case the system control unit 211 determines that the viewing starting time has passed the first event-generating time (a timing not allowing obtaining the right to receive a reward), the channel selection control unit 213 is notified of this face. Here, the channel selection unit 213 receives the above notification, even if the broadcasted broadcast program includes the print-based viewer reward service, transiting to warning mode is not conducted by the channel selection unit 213.

Second Embodiment

In the first embodiment, an exemplary case of viewing a broadcast program that includes the print-based viewer reward service in real-time has been explained. However, as explained above, the digital broadcast receiving apparatus 20 includes the video recording control unit 220, and therefore, viewing the broadcast program that includes the print-based viewer reward service not in real-time but later as a playback of a recording is possible. In the second embodiment, an exemplary case of viewing a broadcast program that includes the print-based viewer reward service, as a playback of a recording, will be explained.

The video recording control unit 220 records a designated broadcast program within a plurality of broadcast programs as well as providing a playback and a stop function. The recorded broadcast program is stored in the memory unit 214 as partial TS.

Figure 11:
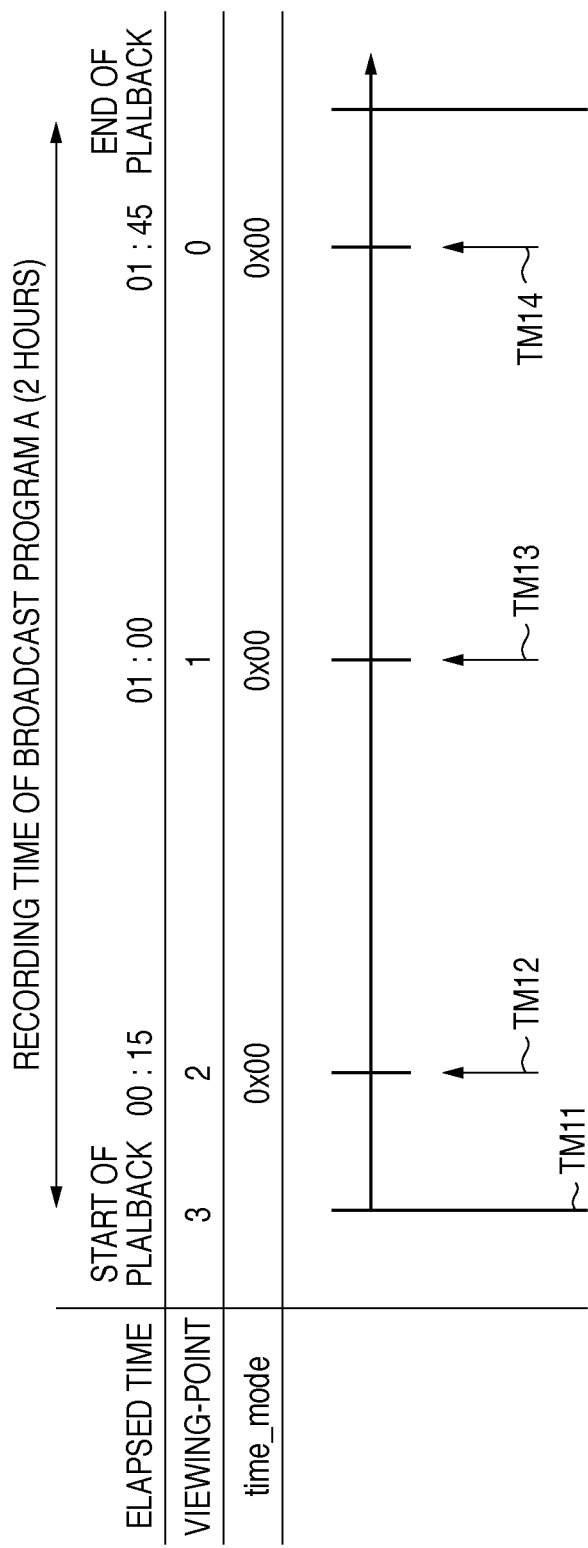
FIG. 11 is a diagram illustrating the overview of a recorded broadcast program, which includes a print-based viewer reward service, from the point at which playing back the recorded program commences up to the point at which the right to receive print content is obtained, when the event message type is time_mode=0x00.

FIG. 11 is a diagram illustrating the overview of a recorded broadcast program, which includes the print-based viewer reward service, from the point at which playing back the recorded program commences up to the point at which the right to receive print content is obtained, when the event message type is time_mode=0x00.

Referring to FIG. 11, at the timing TM11 that starts the playback (start of viewing) of a recorded broadcast program which includes the print-based viewer reward service, the necessary viewing-point-count (viewing condition) that enables receiving print content as a reward from printing content meta information is obtained. Specifically, the video recording control unit 220 sends the partial TS stored in the memory unit 214 to the data division unit 202, and then, it obtains the viewing-point-count by reading printing content meta-information separated using the partial TS. In the embodiment of the present embodiment, the necessary viewing-point-count to receive (viewing condition) the print content is set as 3. Moreover, first event-generating time is defined as 15 minutes after starting the playback of the recorded broadcast program. Here, at the timing TM1, as will be explained in detail later, the channel selection control unit 213 transits the mode which relates to playback controlling of the recorded broadcast program, from the normal mode to the warning mode.

Next, at the timing TM12 where 15 minutes has passed after the recorded broadcast program playback is started, the first event message is received. Since the event message type is time_mode=0x00, as soon as the event message is received, the viewing-point-count is reduced by 1. As a result, the viewing-point-count becomes 2.

Next, at the timing TM13 where 1 hour has passed after the recorded broadcast program playback is started, the second event message is received. Since the event message type is time_mode=0x00, as soon as the event message is received, the viewing-point-count is reduced by 1. As a result, the viewing-point-count becomes 1.

Next, at the timing TM14 where 1 hour and 45 minutes has passed after the recorded broadcast program started the playback, the third event message is received. Since the event message type is time_mode=0x00, as soon as the event message is received, the viewing-point-count is reduced by 1. As a result, the viewing-point-count becomes 0, and therefore, the viewer obtains the right to receive print content as a reward.

Figure 12:
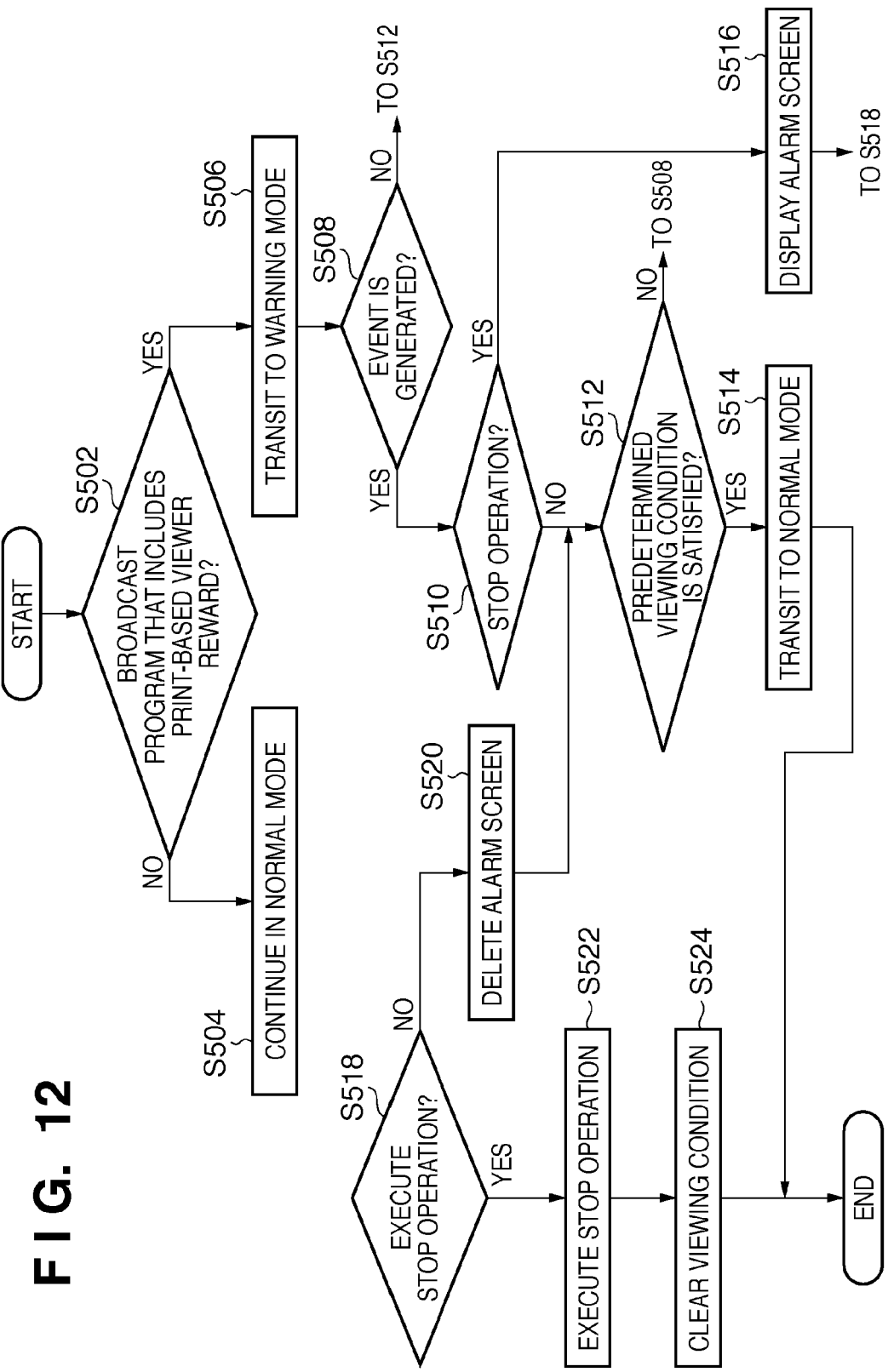
FIG. 12 is a flowchart for explaining exemplary operations (processing) of a digital broadcast receiving apparatus according to one aspect of the present invention.

FIG. 12 is a flowchart for explaining exemplary operations of the digital broadcast receiving apparatus 20. Here, special characteristics exist when the operations of the digital broadcast receiving apparatus 20 according to the present embodiment has transited the mode which relates to playback control of the recorded broadcast program, to warning mode, and therefore, the explanation below will be given with a focus on the warning mode.

Referring to FIG. 12, in step S502, the video recording control unit 220 determines whether or not the broadcast program viewed by playback includes the print-based viewer reward service.

In the case that it is determined that the broadcast program viewed by playback does not include the print-based viewer reward service, in step S504, the channel selection control unit 213 maintains the mode, which relates to recorded broadcast programs playback control, in the normal mode. The normal mode is the mode that conducts stopping and playing back processes of the recorded broadcast program in response to the viewer's stop and playback instructions.

On the other hand, in the case that it is determined that the broadcast program viewed by playback includes the print-based viewer reward service, the process proceeds to step S506.

In step S506, the channel selection control unit 213 transits the mode which relates to the recorded broadcast program playback control from the normal mode to the warning mode. The warning mode is the mode in which the viewer is notified about the loss of reward if viewer executed playback stop operations are detected by the video recording control unit 220 while playing back the broadcast program that includes the print-based viewer reward service.

In step S508, the system control unit 211 determines whether or not events are generated by such as remote controller 252 operations by the viewer or reception of event message.

In the case that the system control unit 211 determines that the event is not generated, the process proceeds to step S512. In the case that the system control unit 211 determines that the event is generated, the process proceeds to step S510.

In step S510, the system control unit 211 determines whether or not the event is a stop operation of the playing back of the recorded broadcast program.

In the case that the event is determined to be the stop operation, the process proceeds to step S516. In the case that the event is determined not to be the stop operation, the process proceeds to step S512.

In step S512, the video record control unit 220 checks whether or not the predetermined viewing condition is satisfied.

If the predetermined viewing condition is not satisfied, the process returns to the step S508. If the predetermined viewing condition is satisfied, the process proceeds to step S514.

In step S514, the video recording control unit 220 receives the print content and stores it in the memory unit 214, and the channel selection control unit 213 transits the mode which relates to the recorded broadcast program's playback control, from the warning mode to the normal mode.

Figure 13:
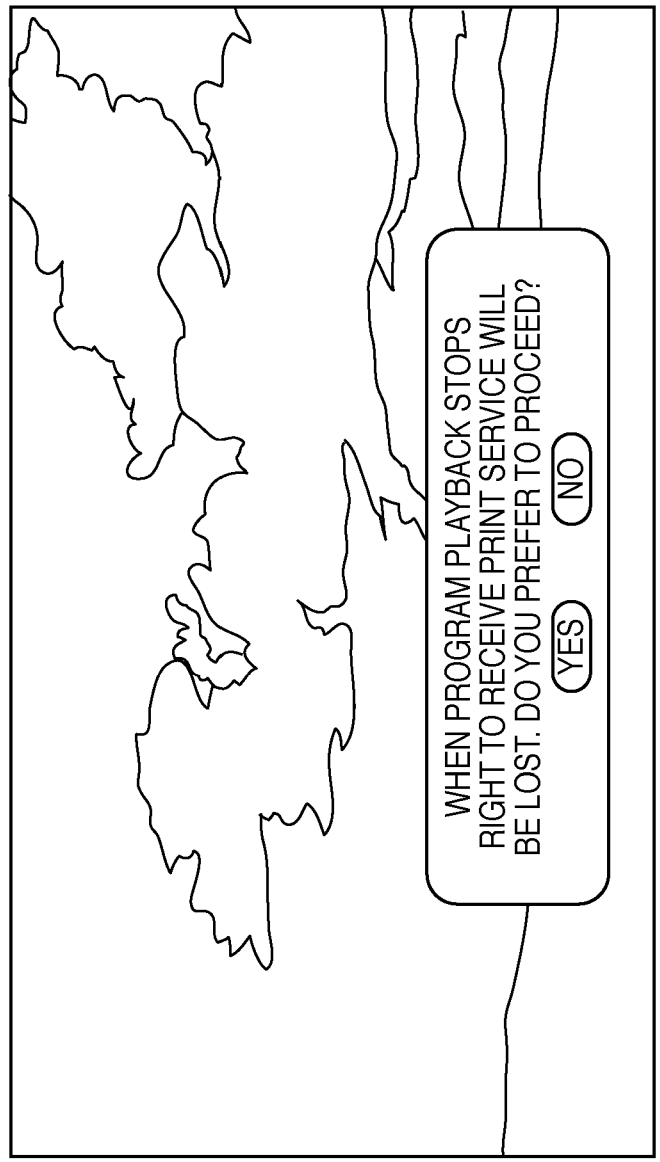
FIG. 13 is an exemplary alarm screen displayed on a video display unit in warning mode.

On the other hand, in case that the event is determined to be the stop operation, in step S516, a notification of the possible loss of the reward obtaining right is given (in other words, an alarm screen is displayed). As an example, the channel selection control unit 213 requests generation of an alarm screen as shown in FIG. 13 to the graphic generation unit 210. FIG. 13 is an alarm screen displayed on a display unit to give the notification: "When the program playback stops, the right to receive print service will be lost. Do you prefer to proceed?", in response to the viewer's stop operation to stop playback. Then, the graphic generation unit 210 displays the alarm screen (FIG. 13) generated by the graphic generation unit 210 on the video display unit 208. Here, FIG. 13 is an exemplary alarm screen displayed on the video display unit 208 in warning mode.

In step S518, the channel selection control unit 213 determines whether or not stop operation is executed. Specifically, in step S516, the channel selection control unit 213 determines whether the "YES" button, which instructs an execution of the stop operation, or "NO" button, which instructs a suspension of the stop operation, on the alarm screen shown in FIG. 13 displayed on the video display unit 208 is selected.

In the case that it is determined that the stop operation is not executed (in other words, the "No" button is selected in the alarm screen shown in FIG. 13), in step S520, the channel selection control unit 213 deletes the alarm screen displayed on the video display unit 208, and the process returns to step S512. In this case, it is obvious without even mentioning it that the video recording control unit 220 does not stop the playback of the recorded broadcast program.

On the other hand, in the case that it is determined that the stop operation is executed (in other words, the Yes button is selected in the alarm screen shown in FIG. 13), in step S522, the video record control unit 220 executes the process for stopping playback of the recorded broadcast program.

Moreover, in step S524, the video record control unit 220 clears (resets) the viewing condition (in the present embodiment, the viewing-point-count) up to now. Therefore, the viewer loses the right to receive the print content (the reward) from a broadcast program that includes the print-based viewer reward service.

As above, according to the second embodiment, while playing back the recorded broadcast program which allows the viewer to obtain the reward by satisfying the predetermined viewing condition, in the case that the stop operation is generated by the viewer, the viewer is notified of the fact that the right to receive the reward will be lost. Therefore, it becomes possible for the viewer to continue playing back while preventing the loss of the right to receive the reward.

Third Embodiment

In the third embodiment, a case where a viewing condition is viewing the program for a time-interval defined by the printing content meta-information (where, viewing condition is not a viewing point counting event message) is been described. In other words, a case of obtaining the right to receive print content by viewing or playing back the broadcast program that includes the print-based viewer reward service for a designated time interval is explained.

Figure 14:
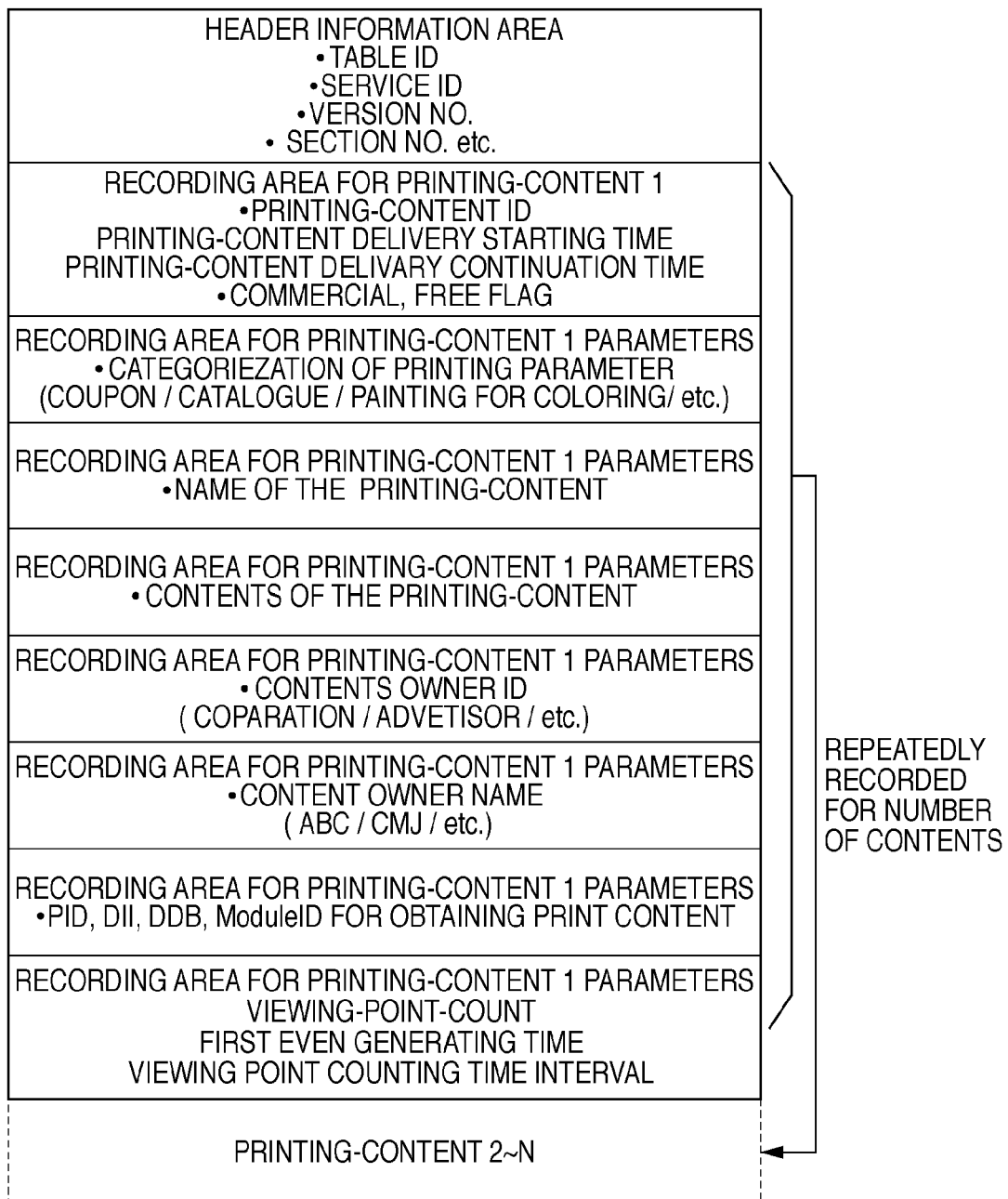
FIG. 14 is a diagram illustrating an exemplary print content meta-information included in the information program data.

FIG. 14 is a diagram illustrating an exemplary print content meta-information included in the information program data. The print content meta-information includes, as shown in FIG. 14, print content type, print content name and print content contents, and as a viewing condition, includes viewing-point-count and time information, etc., as well as a viewing-point-count interval. Here, a viewing-point-count interval is defined for each viewing-point-count.

Figure 15:
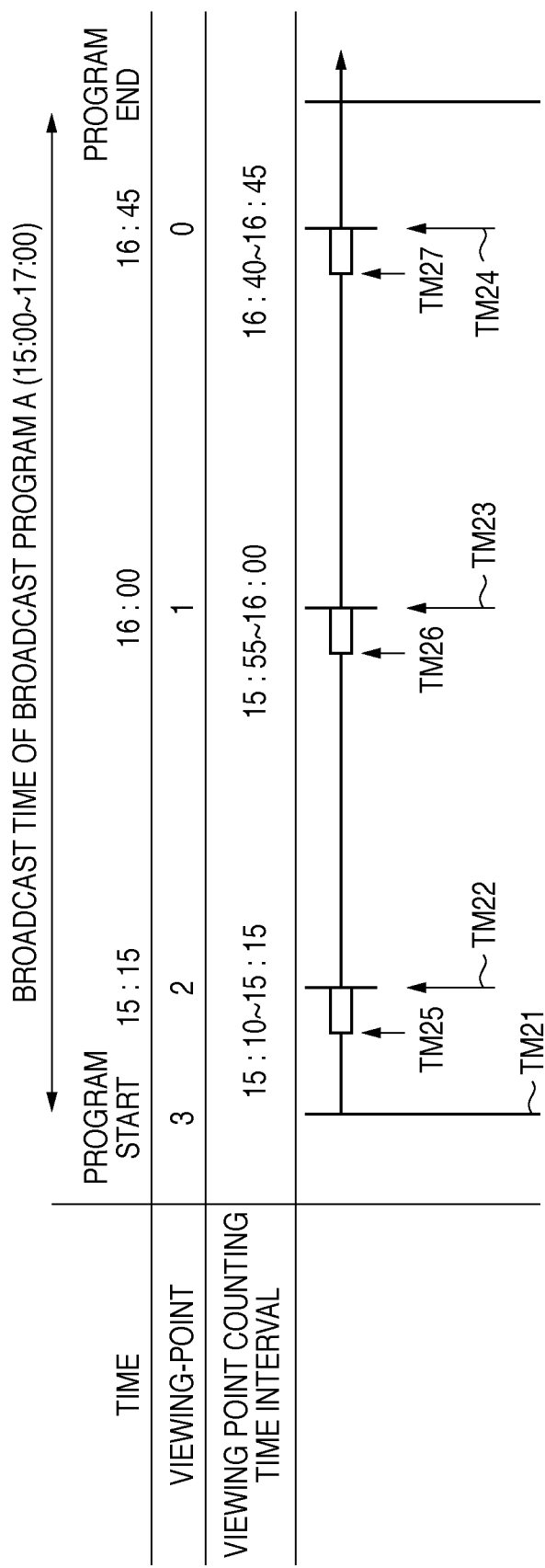
FIG. 15 is a diagram illustrating the overview of a broadcast program, which includes a print-based viewer reward service, from the point at which viewing of the program commences up to the point at which the right to receive print content is obtained.

FIG. 15 is a diagram illustrating the overview of a broadcast program, which includes a print-based viewer reward service, from the point at which viewing of the program commences up to the point at which the right to receive print content is obtained. Here, in FIG. 15, the broadcast program including the print-based viewer reward service starting time and the viewing time are considered to be the same.

Referring to FIG. 15, first, at the timing TM21 the broadcast program with the print-based viewer reward service starts broadcasting the program (starts viewing the program), and obtains viewing points (a viewing condition) necessary for obtaining the print content as a reward from printing content data. In the present embodiment, a viewing-point-count necessary (viewing condition) for obtaining the printing content is set as 3. Moreover, the first event generating time is defined as 15:15 (hrs). The channel selection control units 213 transits the mode, which relates to channel selection control, to the warning mode from the normal mode.

Next, at the timing TM25 where the time is 15:10 (hrs), the first view-point-count interval is started, if the channel selection process is executed up to the end of the view-point-count interval timing TM22 (time 15:15 hrs), the viewing-point-count is reduced by 1. As a result, the viewing-point-count becomes 2.

Next, at the timing TM26 where the time is 15:55 (hrs), the second view-point-count interval is started, and if the channel selection process is executed up to the end of the view-point-count interval timing TM23 (time 16:00 hrs), the viewing-point-count is reduced by 1. As a result, the viewing-point-count becomes 1.

Next, at the timing TM27 where the time is 16:40 (hrs), the third view-point-count interval is started, and if the channel selection process is executed up to the end of the view-point-count interval timing TM24 (time 16:45 hrs), the viewing-point-count is reduced by 1. As a result, the viewing-point-count becomes 0, and therefore, the viewer obtains the right to receive print content as the reward.

Since the operations of the digital broadcast receiving apparatus 20 are similar to that of the first embodiment, a detailed explanation is omitted here.

As above, according to the predetermined viewing condition, viewing within two designated time points, viewing within a designated time period or playing back for a designated time period allows obtaining a similar effect to first embodiment and second embodiment. That is, while viewing or playing back the broadcast program which allows the viewer to obtain the reward by satisfying the predetermined viewing condition, in the case that the stop operation or channel selection operation is generated, the viewer is notified (warned) of the fact that the right to obtain the reward will be lost. Therefore, it becomes possible for the viewer to continue viewing (playing back) while preventing the loss of the right to receive the reward.

Fourth Embodiment

In the fourth embodiment, the print-based viewer reward service is implemented as an application downloaded from the digital broadcast. Specifically, this application is downloaded at the beginning of the viewing of the broadcast program. Moreover, the print content meta-information of the first embodiment to third embodiment such as the viewing-point-count, the first event generated time, viewing-point-count interval, etc., is hidden in this application.

The present embodiment is able to operate in a java-based application environment according to the European data broadcast standard. Here, the European data broadcast standard includes MHP (Multimedia Home Platform), GEM (Globally Executable MHP), OCAP (Open Cable Application Platform), and the like.

Figure 16:
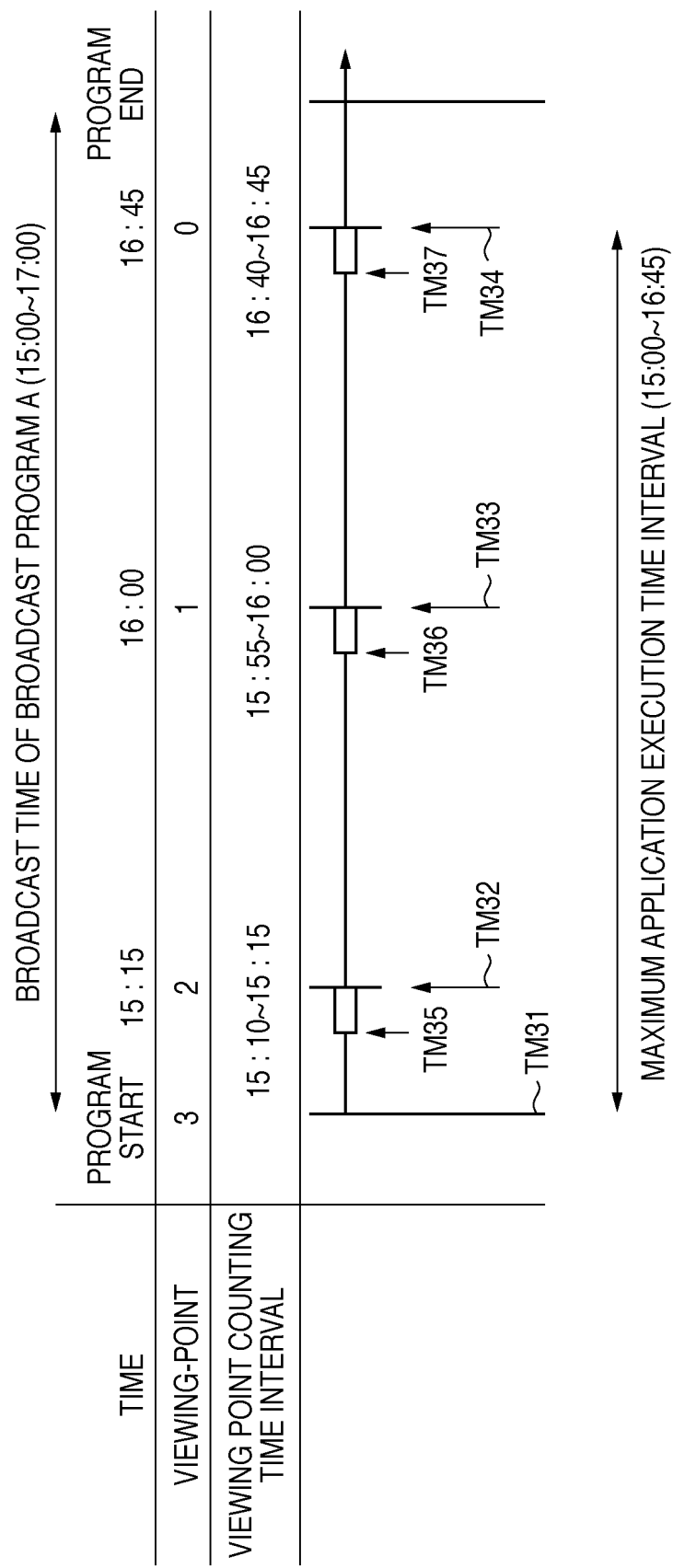
FIG. 16 is a diagram illustrating the overview of a recorded broadcast program, which includes a print-based viewer reward service, from the point at which playing back the recorded program commences up to the point at which the right to receive print content is obtained, in case that an application is used.

FIG. 16 is a diagram illustrating the overview of a recorded broadcast program, which includes the print-based viewer reward service, from the point at which playing back the recorded program commences up to the point at which the right to receive print content. Here in FIG. 16, the broadcast program including the print-based viewer reward service starting time and the viewing time are considered to be the same.

Referring to FIG. 16, first, at the timing TM31 that the broadcast program including the print-based viewer reward service is started, the system control unit 211 executes the downloaded application. At present, the viewing-point-count (viewing condition) for receiving the print content is set as 3. At the timing TM31, the channel selection control unit 213 transits the mode, which relates to channel selection control, to the warning mode from the normal mode.

Next, at the timing TM35 where the time is 15:10 (hrs), the first view-point-count interval is started, and if the channel selection process is executed up to the end of the view-point-count interval timing TM32 (time 15:15 hrs), the viewing-point-count is reduced by 1. As a result, the viewing-point-count becomes 2.

Next, at the timing TM36 where the time is 15:55 (hrs), the second view-point-count interval is started, and if the channel selection process is executed up to the end of the view-point-count interval timing TM33 (time 16:00 hrs), the viewing-point-count is reduced by 1. As a result, the viewing-point-count becomes 1.

Next, at the timing TM37 where the time is 16:40 (hrs), the third view-point-count interval is started, and if the channel selection process is executed up to the end of the view-point-count interval timing TM34 (time 16:45 hrs), the viewing-point-count is reduced by 1. As a result, the viewing-point-count becomes 0, and therefore, the application executes print content printing.

Since the operations of the digital broadcast receiving apparatus 20 are similar to that of the first embodiment, a detailed explanation is omitted.

As above, when the print-based viewer reward service is implemented as the application downloaded from the digital broadcast, it is possible to obtain a similar effect as in the first embodiment and second embodiment. That is, while viewing or playing back a broadcast program which allows the viewer to obtain the reward by satisfying the predetermined viewing condition, in the case that the stop operation or channel selection operation is generated, the viewer is notified (warned) of the fact that the right to receive the reward will be lost. Therefore, it becomes possible for the viewer to continue viewing (playing back) while preventing the loss of the right to receive the reward.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2008-246598 filed on Sep. 25, 2008, which is hereby incorporated by reference herein in its entirety.

What is claimed is:

1. A receiving apparatus for receiving digital broadcast having a plurality of channels comprising:
    a detecting unit configured to detect a channel selection operation that conducts channel selection;
    a determining unit configured to determine whether or not the viewing state of a viewer satisfies a predetermined viewing condition of a broadcast program so that the viewer of the broadcast program is able to obtain a right to receive a predetermined privilege; and
    a notifying unit configured to notify that the right to receive the predetermined privilege will be lost, in the case where the determining unit determines that the viewer of the broadcast program is able to obtain the right to receive the predetermined privilege and the detecting unit detects a channel selection operation that selects another channel from the viewing channel broadcasting the broadcast program by which the viewer is able to obtain the right to receive the predetermined privilege.

2. A receiving apparatus according to claim 1, further comprising a discrimination unit configured to discriminate whether or not a viewing start time of the broadcast program is a timing that the viewer of the broadcast program is able to obtain the right to receive the predetermined privilege, in the case where the determining unit determines that the viewer of the broadcast program is able to obtain the right to receive the predetermined privilege,
    the notifying unit does not notify that the right to receive the predetermined privilege will be lost, in the case where that the discrimination unit discriminates that the viewing start time of the broadcast program is not the timing that the viewer of the broadcast program is able to obtain the right to receive the predetermined privilege.

3. A receiving apparatus according to claim 1, wherein the detecting unit detects at least one of a channel selection operation according to a instruction of the viewer and a channel selection operation for recording reserved broadcast program as the channel selection operation.

4. A receiving apparatus according to claim 1, wherein the determining unit determines whether or not the viewer of the broadcast program is able to obtain the right to receive the predetermined privilege, based on program information data of the broadcast program selected from the plurality of channels.

5. A receiving apparatus according to claim 1, wherein the predetermined viewing condition is at least one from among:
    viewing the broadcast program by which the viewer is able to obtain the right to receive the predetermined privilege, at a designated time;
    viewing the broadcast program by which the viewer is able to obtain the right to receive the predetermined privilege, within two designated time points; and
    viewing the broadcast program by which the viewer is able to obtain the right to the receive the predetermined privilege, for a designated time interval.

6. A receiving apparatus according to claim 1, further comprising a display unit configured to display a notification screen to notify that the right to receive the predetermined privilege will be lost.

7. A receiving apparatus according to claim 1, wherein the predetermined privilege is print content that can be printed with a printing device connected to the receiving apparatus, image contents of still images or videos, or application that can be executed on the receiving apparatus.

8. A receiving apparatus for receiving digital broadcast having a plurality of channels comprising:
    a recording control unit configured to record a designated broadcast program, as well as playback or stop the recorded broadcast program;
    a detecting unit configured to detect a stop operation that stops a playback of the recorded broadcast program;
    a determining unit configured to determine whether or not the viewing state of a viewer satisfies a predetermined viewing condition of the recorded broadcast program so that the viewer of the recorded broadcast program is able to obtain a right to receive a predetermined privilege; and
    a notifying unit configured to notify that the right to receive the predetermined privilege will be lost, in the case where the determining unit determines that the viewer of the recorded broadcast program is able to obtain the right to receive the predetermined privilege and the detecting unit detects the stop operation that stops the playback of the recorded broadcast program while playing back the recorded broadcast program.

9. A receiving apparatus according to claim 8, wherein the determining unit determines whether or not the viewer of the recorded broadcast program is able to obtain the right to receive the predetermined privilege, based on program information data of the recorded broadcast program.

10. A receiving apparatus according to claim 8, wherein the predetermined viewing condition is playing back the recorded broadcast program for a designated time interval.

11. A receiving apparatus according to claim 8, further comprising a display unit configured to display a notification screen to notify that the right to receive the predetermined privilege will be lost.

12. A receiving apparatus according to claim 8, wherein the predetermined privilege is print content that can be printed with a printing device connected to the receiving apparatus, image contents of still images or videos, or application that can be executed on the receiving apparatus.

13. A controlling method of a receiving apparatus for receiving digital broadcast having a plurality of channels comprising:
   a detecting step for detecting a channel selection operation that conducts channel selection;
   a determining step for determining whether or not the viewing state of a viewer satisfies a predetermined viewing condition of a broadcast program so that the viewer of the broadcast program is able to obtain a right to receive a predetermined privilege; and
   a notifying step for notifying that the right to receive the predetermined privilege will be lost, in the case where the determining step determines that the viewer of the broadcast program is able to obtain the right to receive the predetermined privilege and the detecting step detects a channel selection operation that selects another channel from the viewing channel broadcasting the broadcast program by which the viewer is able to obtain the right to receive the predetermined privilege.

14. A controlling method according to claim 13, further comprising a discrimination step for discriminating whether or not a viewing start time of the broadcast program is a timing that the viewer of the broadcast program is able to obtain the right to receive the predetermined privilege, in the case where the determining step determines that the viewer of the broadcast program is able to obtain the right to receive the predetermined privilege,
   the notifying step does not notify that the right to receive the predetermined privilege will be lost, in the case where the discrimination step discriminates that the viewing start time of the broadcast program is not the timing that the viewer of the broadcast program is able to obtain the right to receive the predetermined privilege.

15. A controlling method according to claim 13, wherein the detecting step detects at least one of a channel selection operation according to a instruction of the viewer and a channel selection operation for recording reserved broadcast program as the channel selection operation.

16. A controlling method according to claim 13, wherein the determining step determines whether or not the viewer of the broadcast program is able to obtain the right to receive the predetermined privilege, based on program information data of the broadcast program selected from the plurality of channels.

17. A controlling method according to claim 13, wherein the predetermined viewing condition is at least one from among:
   viewing the broadcast program by which the viewer is able to obtain the right to receive the predetermined privilege, at a designated time;
   viewing the broadcast program by which the viewer is able to obtain the right to receive the predetermined privilege, within two designated time points; and
   viewing the broadcast program by which the viewer is able to obtain the right to the receive the predetermined privilege, for a designated time interval.

18. A controlling method according to claim 13, further comprising a display step for displaying a notification screen to notify that the right to receive the predetermined privilege will be lost.

19. A controlling method according to claim 13, wherein the predetermined privilege is print content that can be printed with a printing device connected to the receiving apparatus, image contents of still images or videos, or application that can be executed on the receiving apparatus.

20. A controlling method of a receiving apparatus for receiving digital broadcast having a plurality of channels comprising:
   a recording control step for recording a designated broadcast program, as well as playing back or stopping the recorded broadcast program;
   a detecting step for detecting a stop operation that stops a playback of the recorded broadcast program;
   a determining step for determining whether or not the viewing state of a viewer satisfies a predetermined viewing condition of the recorded broadcast program so that the viewer of the recorded broadcast program is able to obtain a right to receive a predetermined privilege; and
   a notifying step for notifying that the right to receive the predetermined privilege will be lost, in the case where the determining step determines that the viewer of the recorded broadcast program is able to obtain the right to receive the predetermined privilege and the detecting step detects the stop operation that stops the playback of the recorded broadcast program while playing back the recorded broadcast program.

21. A controlling method according to claim 20, wherein the determining step determines whether or not the viewer of the recorded broadcast program is able to obtain the right to receive the predetermined privilege, based on program information data of the recorded broadcast program.

22. A controlling method according to claim 20, wherein the predetermined viewing condition is playing back the recorded broadcast program for a designated time interval.

23. A controlling method according to claim 20, further comprising a display step for displaying a notification screen to notify that the right to receive the predetermined privilege will be lost.

24. A controlling method according to claim 20, wherein the predetermined privilege is print content that can be printed with a printing device connected to the receiving apparatus, image contents of still images or videos, or application that can be executed on the receiving apparatus.

* * * * *